United States Patent [19]

Culbert

[11] Patent Number: 5,557,777

[45] Date of Patent: Sep. 17, 1996

[54] METHOD AND APPARATUS FOR SYSTEM RECOVERY FROM POWER LOSS

[75] Inventor: Michael F. Culbert, San Jose, Calif.

[73] Assignee: Apple Computer, Inc., Cupertino, Calif.

[21] Appl. No.: 315,951

[22] Filed: Sep. 30, 1994

[51] Int. Cl.⁶ .............................. G06F 11/34; G06F 12/16
[52] U.S. Cl. ...................... 395/500; 395/750; 364/280.2; 364/492; 364/707
[58] Field of Search ....................................... 395/500, 575, 395/750, 182.2, 182.22, 182.12, 182.13, 375; 365/226, 229; 364/184, 187, 707, 492, 273.4, 229, 273.2, 280.2, 280.3, 280.8, 281.3

[56] References Cited

U.S. PATENT DOCUMENTS

| | | | |
|---|---|---|---|
| 4,868,832 | 9/1989 | Marrington et al. | 371/66 |
| 4,905,196 | 2/1990 | Kirrmann | 365/200 |
| 4,979,143 | 12/1990 | Takano et al. | 364/900 |
| 5,175,847 | 12/1992 | Mellott | 395/575 |
| 5,193,176 | 3/1993 | Brandin | 395/575 |
| 5,339,426 | 8/1994 | Aoshima | 395/700 |
| 5,390,324 | 2/1995 | Burckhartt et al. | 395/575 |
| 5,426,775 | 6/1995 | Boccon-Gibod | 395/575 |
| 5,438,549 | 8/1995 | Levy | 365/229 |

*Primary Examiner*—Kevin J. Teska
*Assistant Examiner*—Tan Nguyen
*Attorney, Agent, or Firm*—Hickman Beyer & Weaver

[57] ABSTRACT

A computer system for system recovery from power loss includes a central processing unit and an activation means for starting up the computer. The computer system also has a cold boot circuit, a system controller, volatile read/write memory, and non-volatile read/write memory. The controller includes a protection register whose value indicates the manner in which the computer system was previously shut-down. One aspect of the present invention is a method for an orderly shut-down which includes the steps of compressing all critical data stored in volatile read/write memory, transferring the compressed critical data into non-volatile read/write memory, writing memory validity data to indicate a successful store and the time and date stored, and shutting down the system. Another aspect of the present invention is a method for system recovery which includes the steps of utilizing the protection register and memory validity data to both recover system and user data if possible and perform only the necessary start-up steps, and setting the protection register to indicate that an orderly shut-down has not occurred.

37 Claims, 6 Drawing Sheets

METHOD AND APPARATUS FOR SYSTEM RECOVERY FROM POWER LOSS

BACKGROUND OF THE INVENTION

The present invention relates generally to computer systems, and more particularly to power management systems for portable computer systems.

Computerized personal organizers are becoming increasingly popular with a large segment of the population. Computerized personal organizers tend to be small, lightweight, relatively inexpensive, and are able to perform such functions as keeping a calendar, an address book, a to-do list, etc. While many of these functions can also be provided in conventional computer systems, personal organizers are very well suited to the personal organization task due to their small size and portability. Computerized personal organizers are available from such companies as Sharp and Casio of Japan.

A relatively new form of computer, the pen-based computer system, holds forth the promise of a marriage of the power of a general purpose computer with the functionality and small size of a computerized personal organizer. A pen-based computer system is typically a small, hand-held computer where the primary method for inputting data includes a "pen" or stylus. A pen-based computer operating as personal organizer or "Personal Digital Assistant" (PDA) is made by Apple Computer, Inc. of Cupertino, Calif. under the trademark Newton™.

The aforementioned functionality of the PDA often requires a lengthy, elaborate start-up procedure. Start-up procedures for a PDA include both hardware and software initializations. Representative hardware start-up procedures include initializing the display screen, the writing tablet, and the system controller, turning power on to and initializing all other peripheral devices, and initializing all system memory. Representative software start-up procedures include building the memory management unit (MMU) tables in system memory, enabling the MMU on the CPU, and starting the operating system.

In addition to start-up procedure requirements, the PDA has unique shut-down requirements. For a PDA, or any computer system, to start-up efficiently, the system must begin from a known state. The start-up is therefore facilitated by an orderly shut-down. Furthermore, the PDA is typically a battery powered device, leaving it especially susceptible to abnormal shut-down conditions in circumstances such as battery failure or when replacing the battery. Thus it is important that memory management and initialization procedures during start-up and shut-down be more sophisticated than in the case of a desk top computer. This sophistication is perhaps a prerequisite for providing the user of a PDA with the expected level of functionality. For example, the PDA should provide key features of the non-electric organizer such as high data integrity and nearly immediate operation access.

From a simplistic view, an on/off switch of a PDA appears to simply switch the system between two states: power supply on and power supply off. But, as is well know to those skilled in the art of computer system design, the typical on/off switch has no direct effect on the power supply of the computer system. Rather, enabling and disabling the on/off switch respectively generate a power-up interrupt and a power-down interrupt within the system. The system responds to the interrupt with a predefined start-up or shut-down procedure, where start-up places the system in an activated state, and shut-down places the system in a non-activated state. It should be appreciated that the non-activated state does not correspond to a zero power-use state, but rather a low power-use state.

In most personal computer systems, when a user turns the on/off switch on, the system responds by performing what is known as a "cold boot" start-up procedure. The cold boot includes the steps required to initially start-up the computer system. As the functionality of the system grows, the time delay of the cold boot can become very undesirable. It should be appreciated that minimizing this delay is critical in the case of the PDA, as the PDA should be approximately as time economical as the non-computerized organizer.

While all of steps of the cold boot may be performed on start-up, the cold boot may include steps which are unnecessary. For example, initializing the display and the digitizing tablet need only occur once initially on the PDA, and thereafter only if an abnormal event has occurred. If an orderly shut-down occurred previously the start-up could skip many of these steps, thereby reducing the start-up time significantly.

Additionally, many of the software initialization steps, while required even after a previous orderly shut-down, are simply repetitive steps performed on each start-up. Page tables of the Newton PDA, which provide structure to the memory, must be rebuilt on each start-up. Any application software or peripheral devices which utilize volatile memory must completely rebuild in memory on each start-up. The operating system often utilizes volatile memory which must be loaded on start-up. The MMU of the Newton PDA and the volatile memory is then updated to reflect the data in memory, which applications are running, and the location and status of the peripherals. Any process which eliminates or reduces the time required for these steps enhances the system.

Prior solutions to the time delay took advantage of knowing that a previous orderly shut-down would leave the computer system in a well defined state. This enabled a normal, "quick boot", start-up procedure which eliminated some of the unnecessary cold boot steps. This decreased, and thereby improved, the typical start-up time. However, these solutions created one problem while not solving another: if a previous shut-down was non-orderly, then the user had to manually force a cold boot start-up, either by disconnecting the power source or by engaging a cold boot button. Depending on the shut-down procedure, valuable user data could be lost.

SUMMARY OF THE INVENTION

The present invention teaches a method and apparatus for system recovery from power loss. More specifically, the apparatus includes a computer system having a central processing unit (CPU), a system controller including a protection register coupled to the CPU, and an activation system for controlling the start-up procedure. The value stored in the protection register indicates the manner in which the computer system was previously inactivated, that is, orderly or non-orderly, and the activation means will perform a start-up procedure based on the value of this register.

In accordance with one aspect of the present invention, the computer system further includes non-volatile and volatile memory. During an orderly shut-down, the critical data stored in the volatile memory is stored in the non-volatile memory, along with a corresponding time stamp including date and time, and memory validity data is stored to indicate a successful store occurred. In one embodiment, the protection register is set to 0 indicating an orderly shut-down has occurred. In accordance with one aspect of the present invention, the critical data can be compressed using a run-length encoding method prior to storage in non-volatile memory. In the previous aspect, the memory validity data is a successful store register with the value 1 corresponding to success and the value 0 corresponding to the memory having an unknown status.

The activation system will, preferably, utilize the protection register, the successful store flag, and the time stamp to perform a start-up procedure based on their values. If the protection register has a value of 0 and the successful store register has a value 1, then the protection register is set to 1, all the critical memory restored from non-volatile to volatile memory, and the system is placed in an active state. Setting the protection register to 1 prepares the system for a future start-up in the event of a non orderly shut-down.

In accordance with another aspect of the present invention, if the protection register has a value 0 and the successful store register has a value 0, then all the volatile memory is initialized, new MMU tables are built in the CPU, the protection register is set to 1, any valid user data found in non-volatile memory is restored to volatile memory, and the system is placed in an active state.

If the protection register has a value 1, the CPU is reset. Further, if the successful store register has a value 1 and the time stamp indicates meaningful data is stored in the non-volatile memory, then the protection register is set to 1, all the memory restored, and the system is placed in an active state. If, instead, the successful store has a value 0 or the time stamp indicates that no meaningful data is stored in the non-volatile memory, then all the volatile memory is initialized, new memory management tables are built in the CPU, the protection register is set to 1, any valid user data found in non-volatile memory is restored, and the system is placed in an active state.

The computer system preferably includes a cold boot circuit which provides a cold boot signal to the controller. If the system receives a cold boot signal, it will reset the CPU, initialize all peripheral devices, initialize the system controller, all the volatile memory is initialized, new memory management tables are built in the CPU, the protection register is set to 1, any valid user data found in non-volatile memory is restored, and the system is placed in an active state.

These and other advantages of the present invention will become apparent upon reading the following detailed descriptions and studying the various figures of the drawings.

DETAILED DESCRIPTION OF THE PREFERRED EMBODIMENTS

Figure 1:
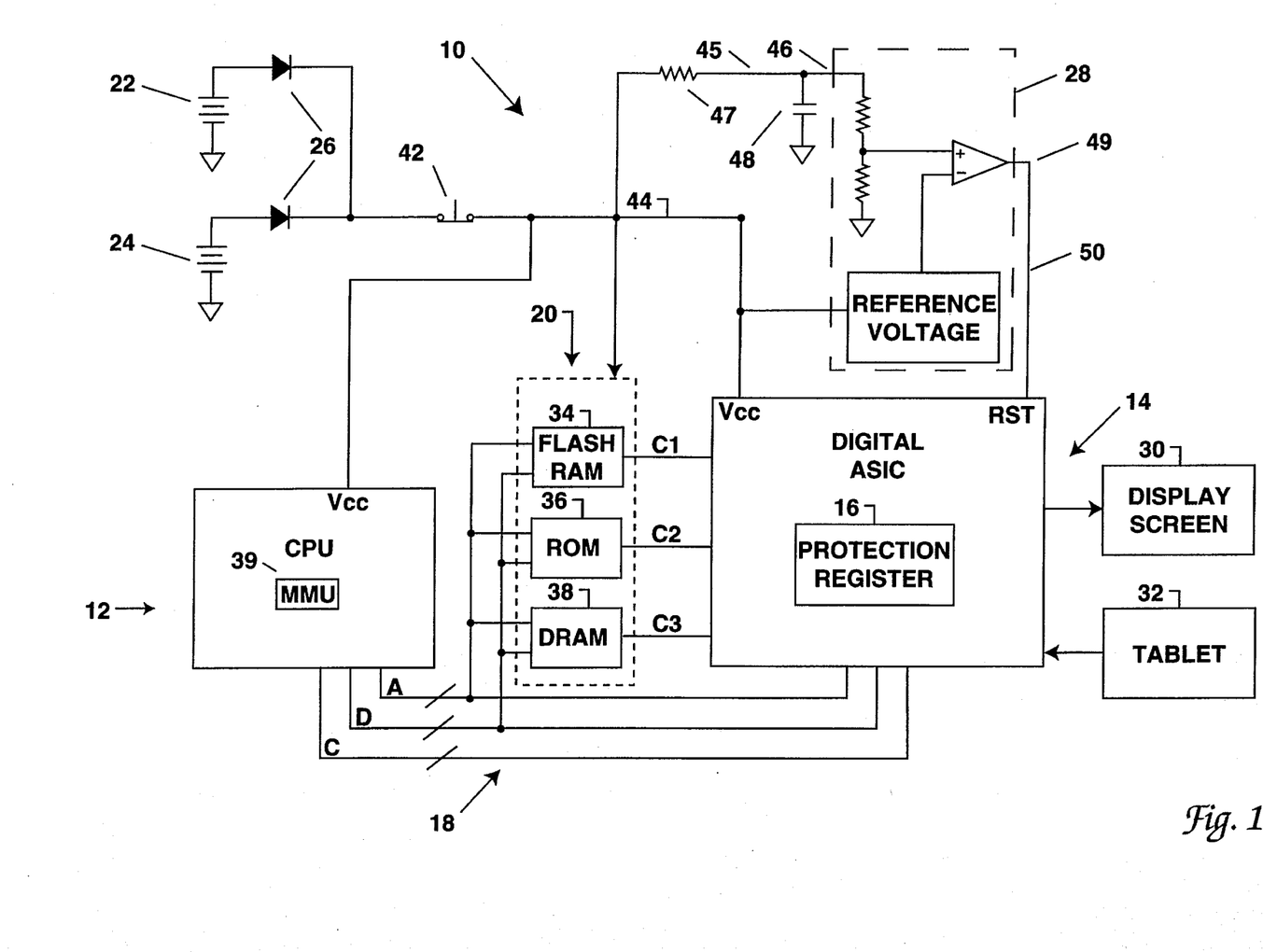
FIG. 1 is a block diagram of a computer system in accordance with the present invention.

In FIG. 1, a computer system 10 in accordance with the present invention includes a central processing unit (CPU) 12, a system controller 14 including a protection register 16, and a communication bus 18. The computer system may also optionally include system memory 20, a main battery 22, a backup battery 24, protection diodes 26, a cold boot reset circuit 28, a display screen 30, and a tablet 32. In the embodiment of FIG. 1, the communication bus 18 comprises a control bus C, a data bus D, and an address bus A. Preferably, the system memory 20 comprises non-volatile read/write memory 34, non-volatile read only memory (ROM) 36, and volatile read/write memory 38.

The CPU 12, non-volatile read/write memory 34, ROM 36, volatile read/write memory 38, and cold boot reset circuit 28 are preferably commercially available integrated circuits ("chips") available from a variety of sources. In one embodiment CPU 12 is a single chip digital processor. ROM 36 contains the basic operation system instructions for the computer system, volatile read/write memory 38 is used for temporary memory, and the non-volatile read/write memory 34 is flash RAM and is used for memory storage during a shut-down state. In another embodiment, the non-volatile read/write memory 34 is simply RAM with its own, separate, battery back-up. In the preferred embodiment, the non-volatile read/write memory 34, the non-volatile ROM 36, and the volatile read/write memory 38, each have a control bus, C1, C2, and C3 respectively, connected directly to the system controller 14.

Preferably, the temporary memory is stored as pages in the volatile read/write memory 38. Temporary memory is under the control of a memory management unit (MMU) 39, which is part of the CPU 12. The non-volatile read/write memory 34 further includes memory validity data in the form of a successful store register, the memory validity data indicative of the validity of the permanent memory stored in the non-volatile read/write memory 34.

The main battery 22 and the backup battery 24 are connected in parallel through the diodes 26 and in series with the cold boot reset switch 42 to the operating power bus 44. The operating power bus 44 is then available to all other system components and peripheral devices.

Figure 2A:
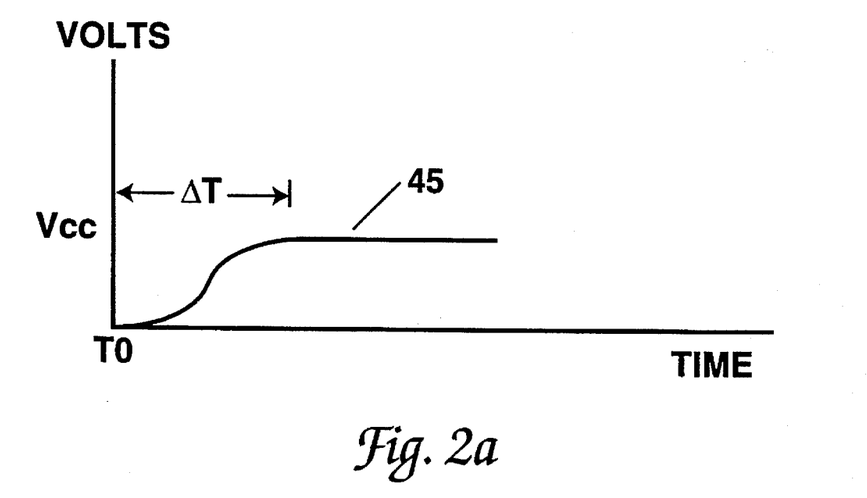
FIG. 2a is a graph illustrating the cold boot circuit input signal as a function of time.

FIG. 2a is a graph plotting the input signal 45 at the cold boot circuit input 46 as a function of time in response to an actual power interrupt. At a time a time TO power is returned to the operating power bus 44. The delay in reaching Vcc, the operating power voltage level, is due to the RC time constant, i.e. charge time, of a resistor 47 and a capacitor 48 of FIG. 1. Preferably the charge time ΔT is approximately 1 millisecond.

Figure 2B:
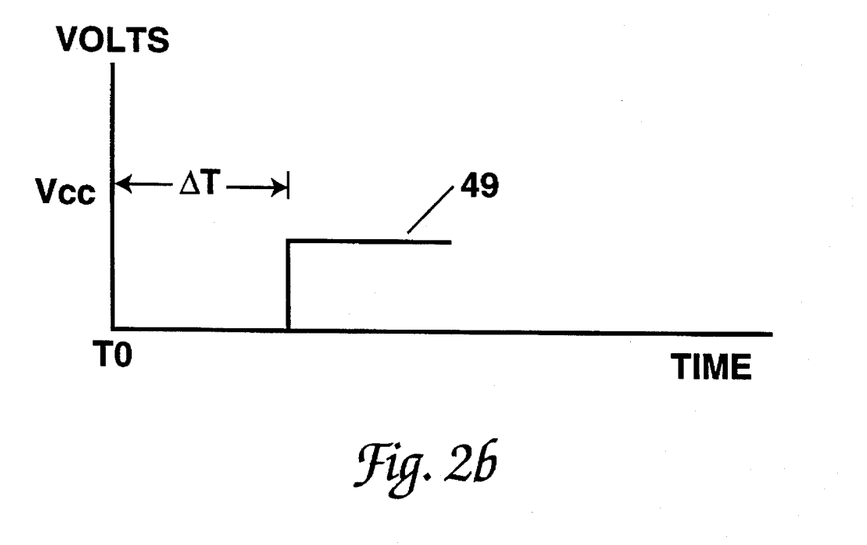
FIG. 2b is a graph illustrating the cold boot circuit output signal as a function of time.

FIG. 2b is a graph plotting the output voltage signal 49 at the cold boot circuit output 50 as a function of time in response to the input voltage signal 45. The cold boot circuit output is tied to a reset input RST of the system controller 14. In one embodiment the power interrupt is forced by an operator pushing the cold boot switch. Additionally the system could include a software forced cold boot. It should be appreciated that removing and replacing all batteries would generate the cold boot signal.

Figure 3:
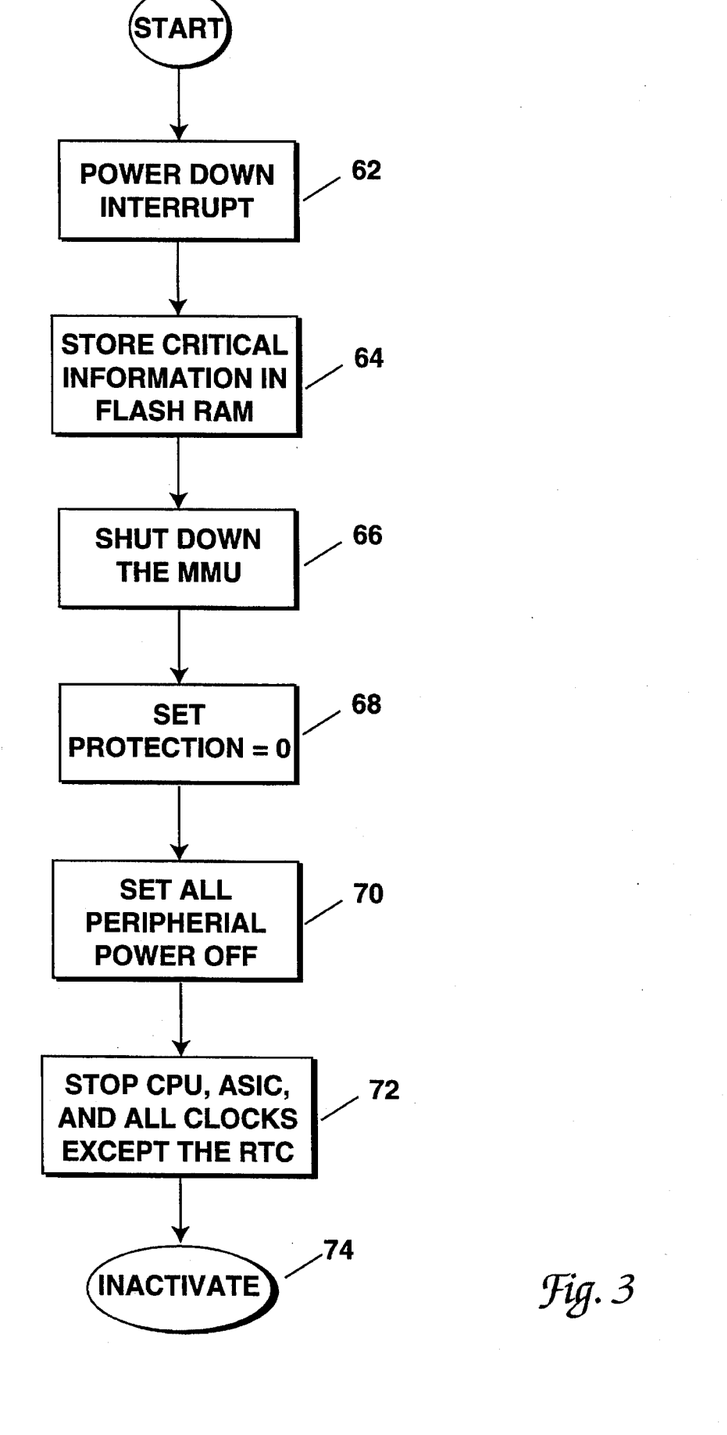
FIG. 3 is a flow diagram of an orderly shut-down procedure of a computer system in accordance with the present invention.

FIG. 3 is a flow diagram for an orderly shut-down process of the computer system 10 in accordance with the present invention. The process of FIG. 3 begins in step 62 with the computer system receiving a power-down interrupt as a result of the user turning the on/off switch to off. The operating system may also initiate a power-down. For example, when the main battery is beginning to fail a power-down initiated by the operating system prevents a disorderly shut-down. In step 64, all critical information is stored in the non-volatile read/write memory 34. Next, in step 66, the MMU is shut-down. In step 68, the protection register 16 is set equal to 0, the value 0 indicating that an orderly shut-down occurred. The process continues in step 70 where all peripheral power is disabled. In step 72, the CPU 12, the system controller 16, and all clocks except a real time clock (RTC) are stopped. Then, in a final step 74, the system is in an inactivated state.

Figure 4:
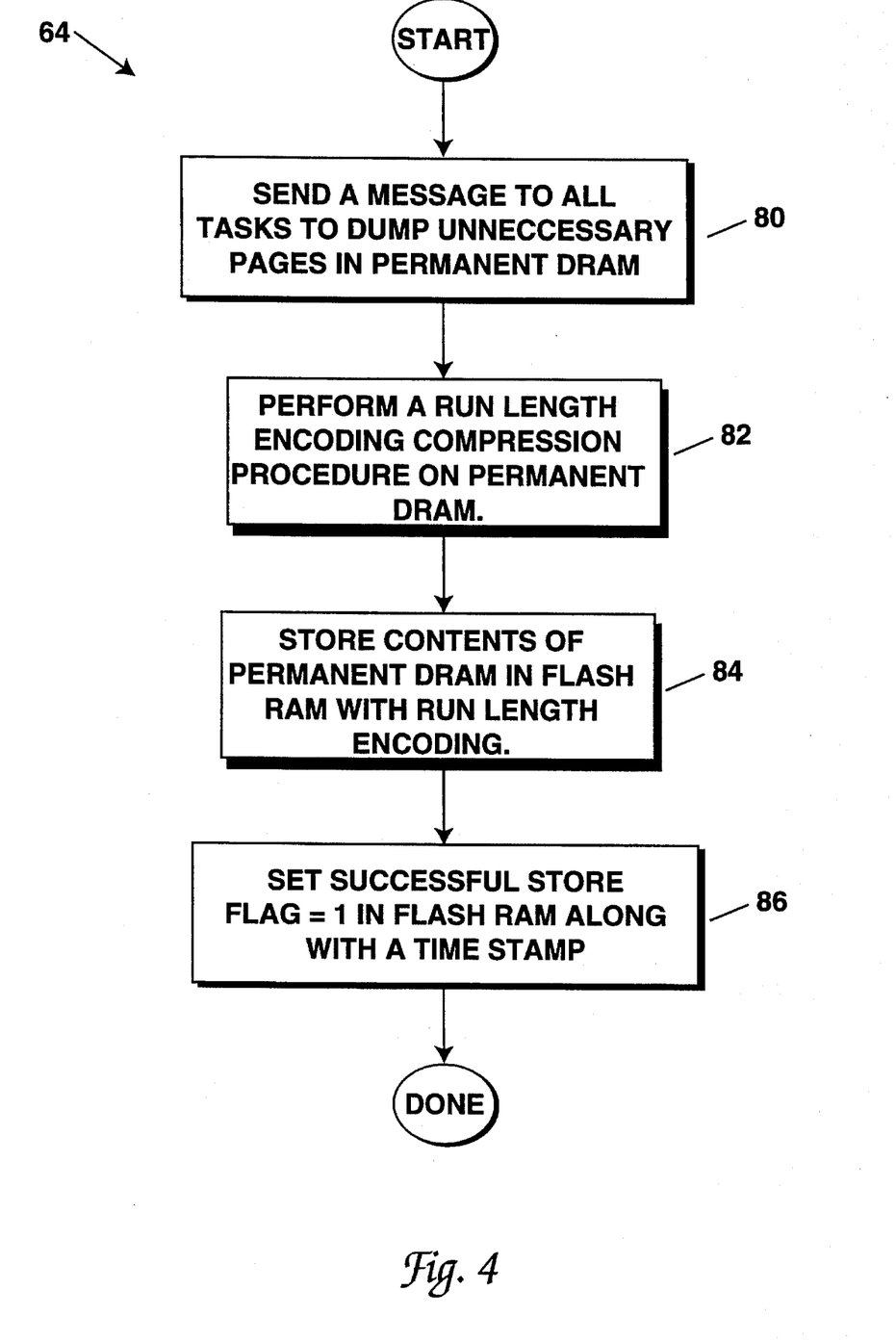
FIG. 4 is a detailed flow diagram of step 64 of FIG. 3.

Step 64 of FIG. 3 is illustrated in greater detail in FIG. 4. The process 64 begins with step 80 by sending a message to all tasks running on the computer system 10 to dump all unnecessary pages stored in the permanent pages of the volatile read/write memory 38. That is, erase all data which is not necessary for an efficient start-up. Next, in step 82, a run length encoding compression is performed on the pages remaining in permanent volatile read/write memory 38. Simplifying, run length encoding replaces zeroes in the data with a marker indicating the location and how many zeroes were removed. This is effective since data is frequently stored inefficiently, at least with respect to memory space, often with zeroes padding out unused space. Run length encoding is well known to those skilled in the art of data compression. Next, in a step 84, the encoded contents of permanent volatile read/write memory 38 are stored in the non-volatile read/write memory 34. Once this is completed, a final step 86 sets a successful store register located in non-volatile read/write memory 34 equal to 1 along with a time stamp, indicating the time and date when the successful store occurred.

Figure 5:
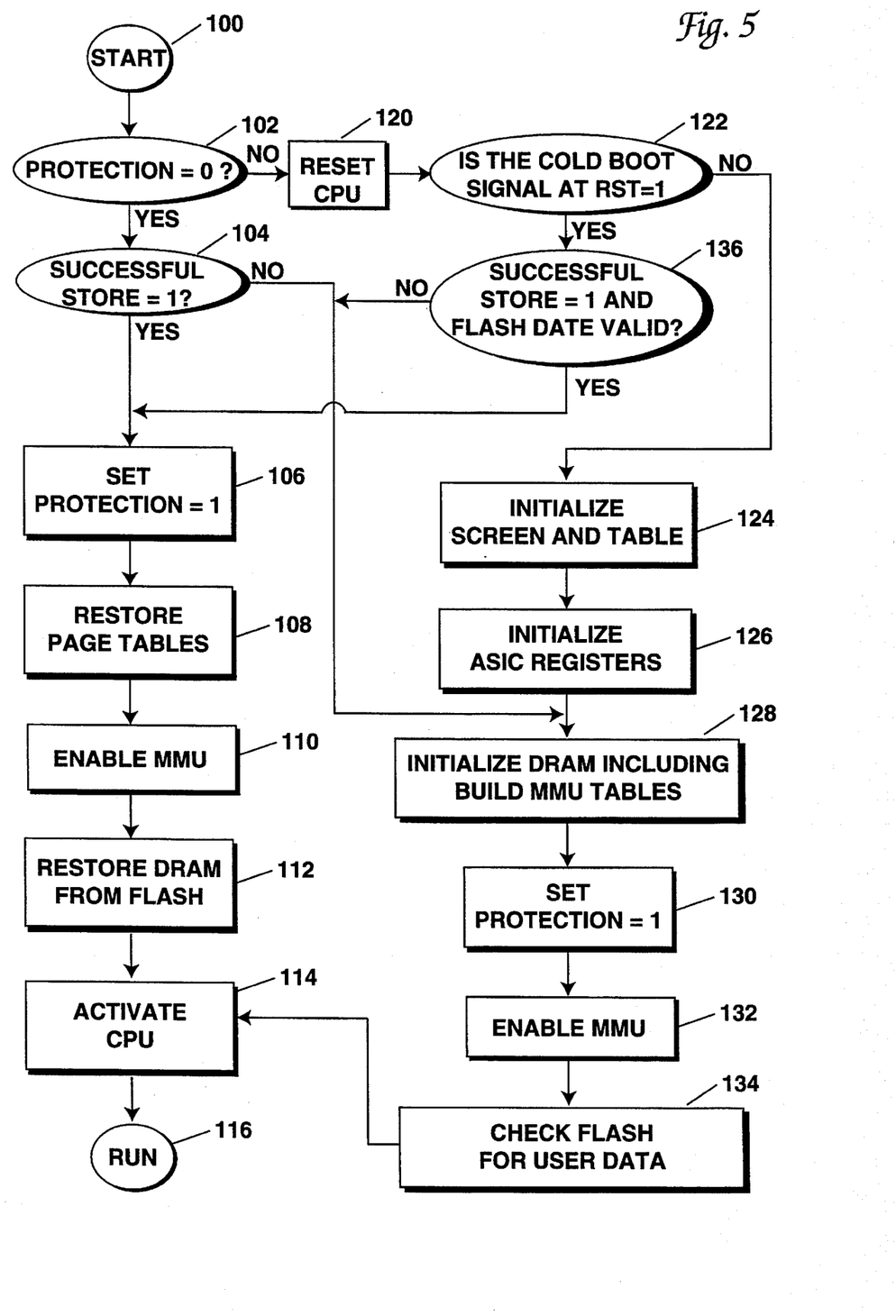
FIG. 5 is a flow diagram of a start-up procedure of a computer system in accordance with the present invention.

The power-up process of FIG. 5 begins in step 100 by receiving a power-up interrupt. In step 102, if it is determined that the protection register is 0, the process proceeds on to step 104. Step 104 determines the value of the successful store flag. If the successful store flag is equal to 1, the process continues in step 106 by setting the protection register equal to 1. Setting the protection register equal to 1 indicates that a previous orderly shut-down has not occurred. In step 108, the page tables are restored in the MMU. Next, in step 110, the MMU is enabled. Then in step 112, which is described in further detail in FIG. 6, the memory stored in non-volatile read/write memory 34 is restored into volatile read/write memory 38. Steps 108–112 comprise the "normal boot" procedure. The process continues in step 114 by activating the CPU. Finally, in step 116, the start-up procedure is complete and the computer system is running.

Beginning down the other branch of step 102, if it is determined that the protection register is not 0, the process proceeds to step 120 and performs a hardware reset of the CPU. The process then continues at step 122 by determining the value of the cold boot signal. That is, what is the voltage level at the system controller input RST. If the signal at RST is 0, the process proceeds to initialize the display screen and tablet in a step 124. The process then continues in step 126 by initializing the system controller. Next, in step 128, the volatile read/write memory 38 is initialized, including building the MMU tables. Then in step 130, the process continues by setting the protection register equal to 1. Next, in step 132 the MMU is enabled. In step 134, the process checks the flash RAM 34 to discern if there is recoverable user data. Steps 124–134 comprise the "cold boot" procedure. The process continues in step 114 by activating the CPU. Finally, in step 116, the start-up procedure is complete and the computer system is running.

Continuing down the other branch of step 122, if it is determined that the cold boot signal at RST is 1, then the process proceeds to step 136 and determines the value of the successful store register and whether or not the date is valid. If the successful store register is 0 or if the date is not valid, the process proceeds on to step 128. In step 128, the volatile read/write memory 38 is initialized, including building the MMU tables. Then in step 130, the process continues by setting the protection register equal to 1. Next, in step 132 the MMU is enabled. In step 134, the process checks the flash RAM 34 to discern if there is recoverable user data. Steps 128–134 comprise the "warm boot" procedure. The process continues in step 114 by activating the CPU. Finally, in step 116, the start-up procedure is complete and the computer system is running.

Continuing down the other branch of step 136, if the value of the successful store register is 1 and the date stamp in the non-volatile read/write memory 38 is valid, than the process proceeds to steps 106–116 as previously described.

If in step 104 the successful store flag is 0, then the process executes steps 128–134, 114, and 116 as previous described.

Figure 6:
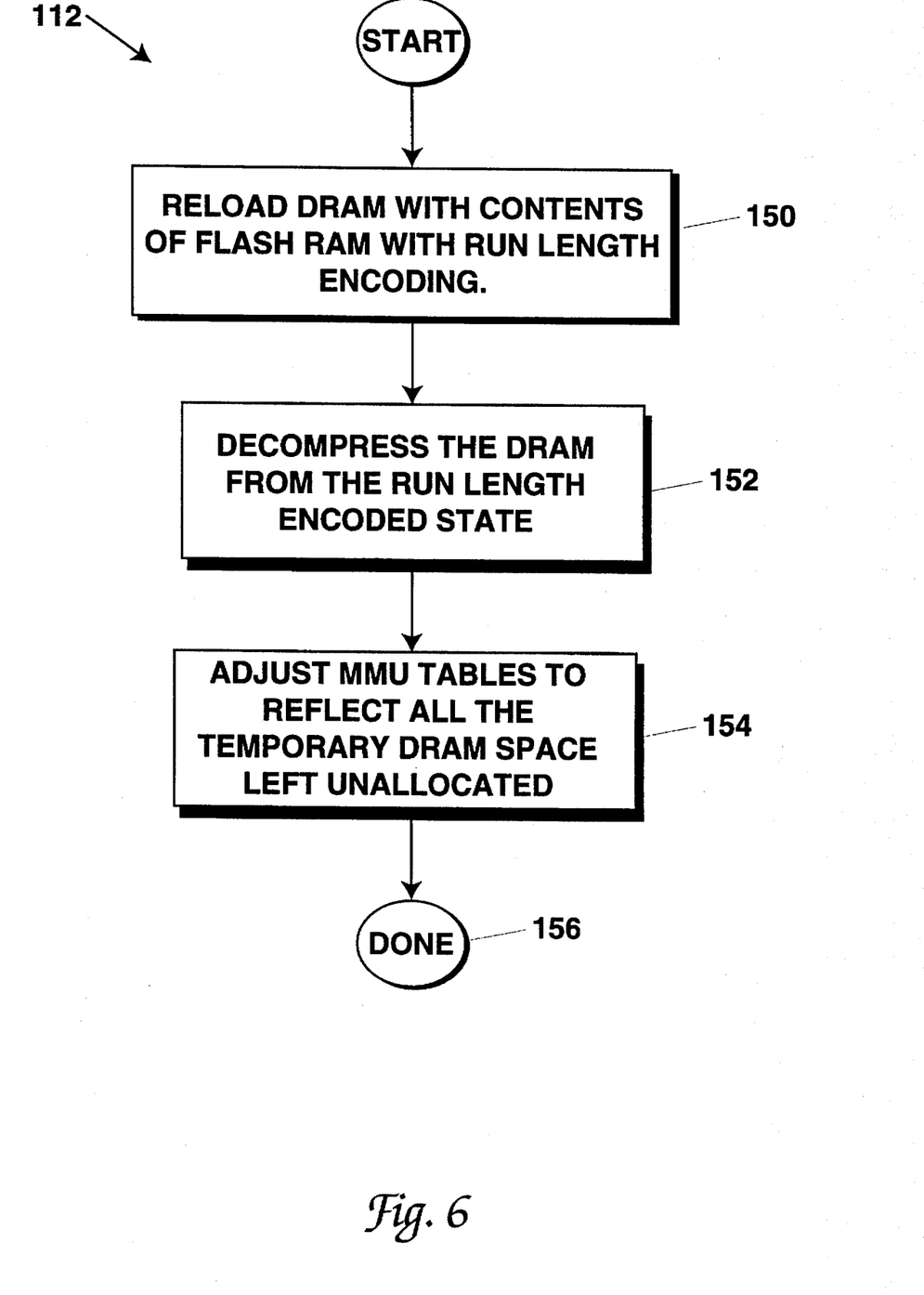
FIG. 6 is a detailed flow diagram of step 112 of FIG. 5.

Step 112 of FIG. 5 is illustrated in more detail in FIG. 6. Step 112 begins in step 150 by reloading the volatile read/write memory 38 with the run length encoded contents of non-volatile read/write memory 34. Next, in step 152, the contents of volatile read/write memory 38 are decompressed into their proper form. Then in step 154, the MMU tables are adjusted to reflect all the temporary volatile read/write memory 38 space left unallocated. In a final step 156, control is returned to step 114 of FIG. 5.

It will therefore be apparent from the forgoing discussions that an effective system for recovery from power loss is produced, while minimizing the system start-up delay. This is accomplished by utilizing non-volatile registers which contain information regarding the nature of a previous system shut-down along with system data stored in non-volatile memory during the previous system shut-down.

While this invention has been described in terms of several preferred embodiments, there are alterations, permutations, and equivalents which fall within the scope of this invention. It should also be noted that there are many alternative ways of implementing both the process and apparatus of the present invention. Particularly, it should be understood that the power supply is not limited to a battery supply. For example, it should be appreciated that a direct current power supply powered by a conventional alternating current power source to produce the required voltage is falls within the scope of the present invention.

It should also be appreciated that the protection register need not be located in the system controller. For example, the protection register can be in the non-volatile read/write memory. In the same vein, the successful store register can be located on the system controller. Additionally, the system controller can be designed to include all the necessary non-volatile memory.

It is therefore intended that the following appended claims be interpreted as including all such alterations, permutations, and equivalents as fall within the true spirit and scope of the present invention.

What is claimed is:

1. A computer system comprising:

a central processing unit (CPU);

a controller including a protection register having a content representing a manner in which said computer system was previously inactivated, said controller being coupled to said CPU for communication therewith; and activation means operative to read said protection register and to activate said computer system in one of a plurality of ways dependent upon said content of said protection register, wherein each of said plurality of ways includes setting said content of said protection register to reflect that a proper inactivation of said computer system has not been performed, whereby when said computer system inactivates improperly, said protected register will reflect such improper inactivation.

2. A computer system as recited in claim 1 further comprising system memory including non-volatile read/write memory coupled to said CPU for communication therewith.

3. A computer system as recited in claim 2 wherein said non-volatile read/write memory is operative to store memory validity data, and wherein said activation means further utilizes said memory validity data to activate said computer system in said one of a plurality of ways.

4. A computer system as recited in claim 3 further comprising a cold boot circuit coupled to said controller for providing a cold boot signal, and wherein said activation means further utilizes said cold boot signal to activate said computer system in said one of a plurality of ways.

5. A computer system as recited in claim 4 wherein said activation means includes a cold boot activator if said cold boot signal is received by said controller.

6. A computer system as recited in claim 4 wherein said activation means further includes a CPU activator.

7. A computer system as recited in claim 1 further comprising means for setting said content of said protection register during an inactivation of said system to reflect a proper previous inactivation of said system.

8. A computer system comprising:

a central processing unit (CPU);

a controller including a protection register having a content representing a manner in which said computer system was previously inactivated, said controller being coupled to said CPU for communication therewith;

a system memory including non-volatile read/write memory coupled to said CPU for communication therewith, said non-volatile read/write memory being operative to store memory validity data;

a cold boot circuit coupled to said controller for providing a cold boot signal; and activation means operative to read said protection register and to activate said computer system in one of a plurality of ways dependent upon at least one of said content of said protection register, said memory validity data, and said cold boot signal, wherein said activation means comprises a normal activator if said protection register indicates a proper previous inactivation and if said memory validity data indicates that said non-volatile memory contains valid data.

9. A computer system as recited in claim 8 wherein said activation means enables a cold boot activator if said cold boot signal is received by said controller and said activation means enables a warm boot activator if said protection register indicates a proper previous inactivation and if said memory validity data indicates that said non-volatile memory does not contain valid data.

10. A computer system as recited in claim 9 wherein said system memory further includes volatile read/write memory, and wherein said CPU further includes a memory management unit (MMU).

11. A computer system as recited in claim 10 wherein said normal activator, when enabled, changes said content of said protection register, transfers data from said non-volatile read/write memory to said volatile read/write memory, and enables said MMU.

12. A computer system as recited in claim 9 wherein said computer system includes a display coupled to said CPU for communication therewith, and wherein said controller includes a plurality of registers, and wherein said cold boot activator, when enabled, initializes said display and said plurality of registers, and then activates said warm boot activator.

13. A computer system as recited in claim 9 wherein said warm boot activator, when enabled, initializes said volatile read/write memory, enables said MMU, sets the content of the protection register, and checks said non-volatile memory for user data.

14. A computer system as recited in claim 9 wherein said activation means further comprises a CPU activator which activates said CPU after one of said normal activator, said cold boot activator, and said warm boot activator has been enabled.

15. A computer system comprising:

a central processing unit (CPU);

a controller including a protection register having a content representing a manner in which said computer system was previously inactivated, said controller being coupled to said CPU for communication therewith;

a system memory including non-volatile read/write memory coupled to said CPU for communication therewith, said non-volatile read/write memory being operative to store memory validity data;

a cold boot circuit coupled to said controller for providing a cold boot signal; and activation means operative to read said protection register and to activate said computer system in one of a plurality of ways dependent upon at least one of said content of said protection register, said memory validity data, and said cold boot signal, wherein said activation means includes a warm boot activator if said protection register indicates a proper previous inactivation and if said memory validity data indicates that said non-volatile memory does not contain valid data.

16. A method for controlling an activation state of a computer system comprising the steps of:

(a) activating a computer system by:
  (i) determining a content of a protection register of said computer system; and
  (ii) activating said computer system in one of a plurality of ways dependent upon said content of said protection register, each of said plurality of ways including the substep of setting said content of said protection register to reflect that a proper inactivation of said computer system has not been performed; and (b) deactivating said computer system such that said content of said protection register is set to a value which reflects a proper inactivation of said system if said computer system is properly inactivated, whereby when said computer system inactivates improperly, said protected register will reflect such improper inactivation.

17. A method as recited in claim 16 wherein the step of activating a computer system further comprises utilizing memory validity data from a non-volatile read/write memory of the computer system to activate said computer system in said one of a plurality of ways.

18. A method as recited in claim 17 wherein the step of activating a computer system further comprises responding to a cold boot signal to activate said computer system in said one of a plurality of ways.

19. A method as recited in claim 18 wherein the step of activating a computer system further comprises resetting a central processing unit (CPU) of said computer if said protection register indicates an improper previous inactivation.

20. A method as recited in claim 19 wherein the step of activating a computer system further comprises performing a normal activating procedure if said protection register indicates an improper previous inactivation and if said memory validity data indicates that said non-volatile memory contains valid data.

21. A method as recited in claim 19 wherein the step of activating a computer system further comprises performing a cold boot activating procedure if said cold boot signal is received by said controller.

22. A method as recited in claim 19 wherein the step of activating a computer system further comprises performing a warm boot activating procedure if said protection register indicates an improper previous inactivation and if said memory validity data indicates that said non-volatile memory does not contain valid data.

23. A method as recited in claim 19 wherein the step of activating a computer system further comprises performing a normal activating procedure if said protection register indicates an improper previous inactivation and if said memory validity data indicates that said non-volatile memory contains valid data, performing a cold boot activating procedure if said cold boot signal is received by said controller, and performing a warm boot activating procedure if said protection register indicates an improper previous inactivation and if said memory validity data indicates that said non-volatile memory does not contain valid data.

24. A method as recited in claim 23 wherein said normal activating procedure comprises the steps of:
restoring data from said non-volatile read/write memory to volatile read/write memory of the computer system; and
enabling a memory management unit (MMU) on said CPU of said computer system.

25. A method as recited in claim 23 wherein said warm boot activating procedure comprises the steps of:
initializing volatile read/write memory of said computer system;
enabling a memory management unit (MMU) on said CPU of said computer system; and checking said non-volatile memory for user data.

26. A method as recited in claim 23 wherein said cold boot activating procedure comprises the steps of:
initializing a display coupled to said CPU of said computer system for communication therewith;
initializing a plurality of registers included in a controller coupled to said CPU for communication therewith;
initializing volatile read/write memory of said computer system;
enabling a memory management unit (MMU) on said CPU; and
checking said non-volatile memory for user data.

27. A method as recited in claim 23 wherein the step of activating a computer system further comprises activating said CPU of the computer system after one of said normal activating procedure, said cold boot activating procedure, and said warm boot activating procedure has been completed.

28. A method as described in claim 16 wherein the step of deactivating said computer system is initiated by receiving a power-down interrupt signal.

29. A method as described in claim 28 wherein the step of deactivating said computer system further comprises the substeps of:
storing critical data from volatile read/write memory of the computer system onto non-volatile read/write memory of said computer system;
setting said protection register;
shutting down a memory management unit (MMU) found on a central processing unit (CPU) of said computer system;
setting power off to all peripheral components of said computer system, said peripheral components including said volatile read/write memory and said non-volatile read/write memory; and
stopping said CPU, a controller for said computer system, and all clocks of said computer system except a real time clock.

30. A method as described in claim 29 wherein storing critical data comprises the steps of:
deleting all non-critical data from said volatile read/write memory;
compressing all critical data from said volatile read/write memory; and
storing compressed critical data onto non-volatile read/write memory.

31. A method for controlling an activation of a computer system comprising the steps of:
determining a content of a protection register of said computer system;
responding to a power up interrupt signal to activate said computer system in one of a plurality of ways dependent upon said content of said protection register; and
deactivating said computer system such that said content of said protection register is set to a value which reflects a proper inactivation of said system if said computer system is properly inactivated,
wherein said one of a plurality of ways includes the step of performing a normal activating procedure if said protection register indicates a proper previous inactivation and if a memory validity data stored in a non-volatile read/write memory of the computer system indicates that said non-volatile memory contains valid data.

32. A method as recited in claim 31 wherein said one of a plurality of ways includes the step of performing a cold boot activating procedure if said cold boot signal is received by said controller and performing a warm boot activating procedure if said protection register indicates a proper previous inactivation and if said memory validity data indicates that said non-volatile memory does not contain valid data.

33. A method as recited in claim 32 wherein said normal activating procedure comprises the steps of:
changing said content of said protection register;
restoring data from said non-volatile read/write memory to volatile read/write memory of the computer system; and
enabling a memory management unit (MMU) on a central processing unit (CPU) of said computer system.

34. A method as recited in claim 32 wherein said warm boot activating procedure comprises the steps of:

initializing volatile read/write memory of said computer system;

enabling a memory management unit (MMU) on a central processing unit (CPU) of said computer system;

setting the content of the protection register; and checking said non-volatile memory for user data.

35. A method as recited in claim 32 wherein said cold boot activating procedure comprises the steps of:

initializing a display coupled to a central processing unit (CPU) of said computer system for communication therewith;

initializing a plurality of registers included in a controller coupled to said CPU of said computer system for communication therewith;

initializing volatile read/write memory of said computer system;

enabling a memory management unit (MMU) on said CPU of said computer system;

setting the content of the protection register; and checking said non-volatile memory for user data.

36. A method as recited in claim 32 wherein the step of activating a computer system further comprises activating a central processing unit (CPU) of the computer system after one of said normal activating procedure, said cold boot activating procedure, and said warm boot activating procedure has been completed.

37. A method for controlling an activation of a computer system comprising the steps of:

determining a content of a protection register of said computer system;

responding to a power up interrupt signal to activate said computer system in one of a plurality of ways dependent upon said content of said protection register; and deactivating said computer system such that said content of said protection register is set to a value which reflects a proper inactivation of said system if said computer system is properly inactivated, wherein said one of a plurality of ways includes the step of performing a warm boot activating procedure if said protection register indicates a proper previous inactivation and if a memory validity data stored in a non-volatile read/write memory of the computer system indicates that said non-volatile memory does not contain valid data.

* * * * *

UNITED STATES PATENT AND TRADEMARK OFFICE
CERTIFICATE OF CORRECTION

PATENT NO. : 5,557,777
DATED : September 17, 1996
INVENTOR(S) : Culbert

It is certified that error appears in the above-indentified patent and that said Letters Patent is hereby corrected as shown below:

Column 2, line 29, change "memory-on" to --memory on--

Signed and Sealed this

Twenty-eighth Day of January, 1997

Attest:

BRUCE LEHMAN

Attesting Officer        Commissioner of Patents and Trademarks